(No Model.)
J. H. BILLING.
COMBINED FLOUR CABINET AND TABLE.
No. 465,108. Patented Dec. 15, 1891.
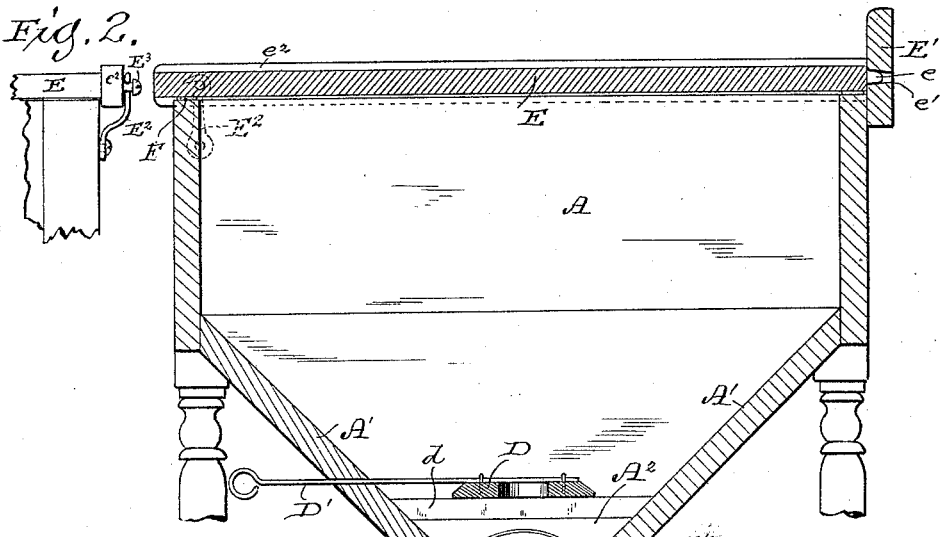
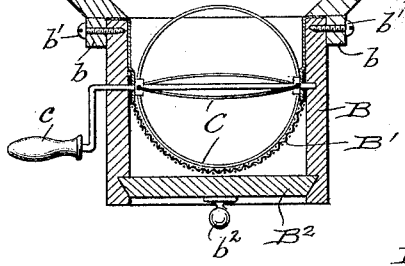
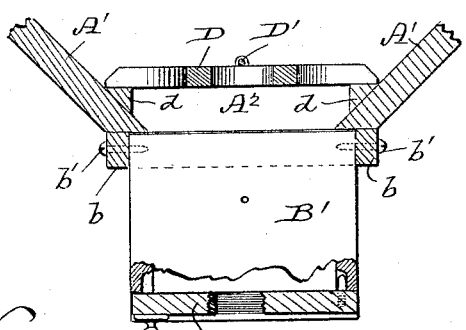
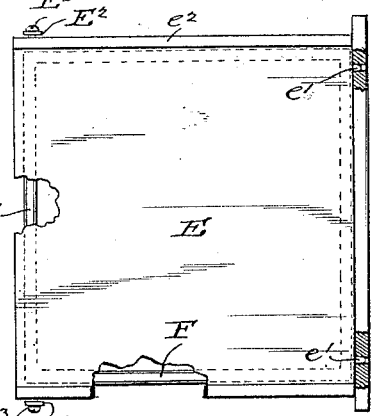
Witnesses
Geo. W. Young
John E. Wiles
Inventor
John H. Billing,
By H. G. Underwood
Attorneys

UNITED STATES PATENT OFFICE.

JOHN H. BILLING, OF MARSHFIELD, WISCONSIN.

COMBINED FLOUR CABINET AND TABLE.

SPECIFICATION forming part of Letters Patent No. 465,108, dated December 15, 1891.

Application filed August 4, 1891. Serial No. 401,699. (No model.)

*To all whom it may concern:*

Be it known that I, JOHN H. BILLING, a citizen of the United States, and a resident of Marshfield, in the county of Wood, and in the State of Wisconsin, have invented certain new and useful Improvements in a Combined Flour Cabinet and Table; and I do hereby declare that the following is a full, clear, and exact description thereof.

My invention relates to certain new and useful improvements in flour-cabinets, and relates more particularly to a combined table, flour box and sieve, and molding-board; and the invention consists in the matters hereinafter described, and pointed out in the appended claims.

In the accompanying drawings, illustrating my invention, Figure 1 is a central vertical section of a device embodying my invention. Fig. 2 is an enlarged detail view of one of the parts. Fig. 3 is a top plan view illustrating the construction of the top of the cabinet. Fig. 4 is a side elevation of the lower portion of the flour-box, showing parts broken away.

In said drawings, A indicates a flour box or bin having inclined lower side walls A' A' and a central discharge-opening at its bottom, as at $A^2$. A sifter-box B is secured to the lower part of the flour-bin and is arranged with its open upper side coincident with the opening $A^2$, so that the flour which is discharged from said opening will pass into said sifter-box. A wire screen B', of the usual hemispherical form, is located in the lower part of the sifter-box B, and a slide $B^2$ is located in the bottom of said box and serves to prevent the escape of flour therefrom when closed. The usual revolving agitator C is suitably journaled within the box B and operates in the ordinary manner to sift the flour and to force it through the meshes of the sieve $B^2$. A crank-shaft c projects from the side of the box B and serves as a means of operating the agitator C. A downwardly-extending flange b is provided about the lower edge of the bin A, and the upper edge of the box B is located within said flange and is secured in this position by means of screws $b^2 b^2$, passed through the flange b and into the side walls of said box.

Within the lower part of the flour-chest A and above the discharge-opening $A^2$ is located a reciprocating shaker D, provided with a handle D', which projects through the front inclined wall of the flour-bin A, and by which it may be moved back and forth within the lower part of the said bin. This shaker D is conveniently arranged to slide upon ways d d, affixed to the inside surfaces of the walls of the bin, as shown in Figs. 1 and 4 of the drawings.

E is the top of the flour-bin, preferably provided with one unpainted side and with one side finished to correspond with the other parts of the device and having two or more projecting dowel-pins e e upon one of its edges, which pins engage with apertures e' e' in an upwardly-projecting flange E upon one side of the bin A. Side flanges $e^2 e^3$ are provided upon two sides of the top E, which fit closely along the sides of the bin, as shown in Figs. 1 and 2, and hooks $E^2 E^2$ are provided upon the upper edges of the side walls of the bin A and are arranged to engage with pins or screws E E in the said flanges, so as to securely hold the top in position upon the bin A. By this arrangement of the top, the same being rendered reversible, either side of the top may be turned upward, as desired, the pins e e and the hooks $E^2 E^2$ serving to hold said top securely in either position. As a further improvement I prefer to provide a strip of cloth or felt upon the upper edges of the side walls of the bin A, upon which the top E rests. This prevents any liability of scratching or marring the finished side of said top when the unfinished side is turned upward.

By the construction shown and herein described the device is adapted to be used as a table, or by turning the top so as to expose the unfinished side it may be used as a molding-board, while by the arrangement of the flour-bin and the sifter directly beneath said top a supply of flour may be readily obtained at any time by opening the slide $B^2$ and operating the handle c in an obvious manner. If the flour should become packed within the bin A, it may be readily loosened up by means of the shaker D, so that it will readily pass into the sifter-box B. The slide $B^2$ serves to prevent dust from getting into the sifter or the bin, and also to exclude insects therefrom. I also prefer to provide a handle or knob $b^2$ upon the slide $B^2$, which projects through said slide and forms a stop $b^3$ to limit the movement of said slide, and also prevents it from being drawn entirely out of the ways in the bottom of the sifter-box B and being mislaid or lost.

It will be seen that my improved device is at once simple in its construction, strong and durable, and cheap to manufacture, besides forming a very convenient and useful article of kitchen furniture.

I would have it understood that I do not desire to limit myself to the exact form of construction illustrated in the drawings, as various modifications may obviously be made in the details of construction without departure from my original invention.

Having described my invention, what I claim as new, and desire to secure by Letters Patent of the United States, is—

The herein-described article of kitchen furniture, comprising a table having a reversible top, a flour-bin located below said top, a packing of felt or analogous material between said top and the side walls of said bin, a discharge-opening in the bottom of said bin communicating with a chamber or box containing a flour-sifter, a reciprocating shaker located in said discharge-opening, and a movable slide or cover in the bottom of said chamber or box, substantially as described.

In testimony that I claim the foregoing I have hereunto set my hand, at Marshfield, in the county of Wood and State of Wisconsin, in the presence of two witnesses.

JOHN H. BILLING.

Witnesses:
E. V. KAUTSKY,
T. SPRINGBORN.